(12) United States Patent
Borshack (10) Patent No.: US 10,073,922 B2
(45) Date of Patent: Sep. 11, 2018

(54) ADVERTISEMENT-CONTROLLED WEB PAGE CUSTOMIZATION

(75) Inventor: Ronen Borshack, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1922 days.

(21) Appl. No.: 11/942,736

(22) Filed: Nov. 20, 2007

(65) Prior Publication Data

US 2009/0132359 A1 May 21, 2009

(51) Int. Cl.
*G06Q 30/00* (2012.01)
*G06F 17/30* (2006.01)
*G06Q 30/02* (2012.01)

(52) U.S. Cl.
CPC ....... *G06F 17/30893* (2013.01); *G06Q 30/02* (2013.01); *G06Q 30/0254* (2013.01)

(58) Field of Classification Search
CPC ..... G06F 8/38; G06F 3/0481; G06Q 30/0601; G06Q 30/0276; G06Q 30/02
USPC .......................................................... 705/14
See application file for complete search history.

(56) References Cited

U.S. PATENT DOCUMENTS

| | | | |
|---|---|---|---|
| 6,442,550 B1* | 8/2002 | Rajamony | G06Q 30/02 707/999.01 |
| 7,631,260 B1* | 12/2009 | Riggs et al. | 715/716 |
| 2002/0101444 A1 | 8/2002 | Novak et al. | |
| 2002/0104096 A1 | 8/2002 | Cramer et al. | |
| 2003/0040970 A1* | 2/2003 | Miller | G06Q 30/02 705/26.1 |
| 2004/0068536 A1 | 4/2004 | Demers et al. | |
| 2005/0267798 A1 | 12/2005 | Panara | |
| 2006/0156283 A1 | 7/2006 | Landau et al. | |
| 2006/0206380 A1 | 9/2006 | Joo | |
| 2006/0285656 A1 | 12/2006 | Saborowski et al. | |
| 2007/0027765 A1* | 2/2007 | Collins | G06Q 10/0631 705/14.53 |
| 2007/0185927 A1 | 8/2007 | Chess et al. | |
| 2007/0201502 A1 | 8/2007 | Abramson | |
| 2007/0271523 A1* | 11/2007 | Lacey et al. | 715/762 |

OTHER PUBLICATIONS

Local MSDN Webcast: "Powerful Website Skinning with CSS and asp.net 2.0", MSDN, retrieved at <<http://www.microsoft.com/belux/msdn/nlevents/2006/aspnet_skinning.mspx>>, p. 1.
"Tunecast—Really Simple Music Broadcast for Your Website", 2007, openPR, retrieved at °°http://www.openpr.com/news/1798/Tunecast-really-simple-music-broadcast-for-your-We . . . >>, pp. 2.
Negovan, "Skinning Web Application with CSS", Feb. 22, 2004, asp.net Resources, pp. 2.
"Cascading Style Sheets Level 2 Revision 1 (CSS 2.1) Specification", Jul. 19, 2007, retrieved at <<http://www.w3.org/TR/2007/CR-CSS21-20070719>>, pp. 405.

* cited by examiner

*Primary Examiner* — Alvin L Brown
(74) *Attorney, Agent, or Firm* — Schwegman Lundberg & Woessner, P.A.

(57) ABSTRACT

In accordance with one or more aspects of the advertisement-controlled Web page customization discussed herein, functionality allowing an advertisement to set various presentation properties of a Web page is exposed. The advertisement invokes the functionality to set a particular presentation property of the Web page to a corresponding property value in order to customize the presentation of the Web page as desired by the advertisement.

13 Claims, 6 Drawing Sheets

ADVERTISEMENT-CONTROLLED WEB PAGE CUSTOMIZATION

BACKGROUND

The use of the Internet and World Wide Web (or simply the Web) has become commonplace throughout the world. Information is typically made available to users via Web pages that are retrieved from servers on the Internet and displayed on the users' computers. In some situations, the companies or individuals that make Web pages available to users generate revenue by selling advertising space on their Web pages to other companies or individuals. This allows an advertiser to display advertisements for various services and/or products to the users when they are displaying the Web pages. These advertisements, however, can result in awkwardly appearing Web pages because the appearance of the advertisements is oftentimes inconsistent with the appearance of the remainder of the Web page.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the advertisement-controlled Web page customization discussed herein, a set page property application programming interface (API) is exposed. The set page property API includes both a name parameter and a value parameter. When the set page property API is invoked by an advertisement being displayed as part of a Web page, a presentation property name is received as the name parameter and a corresponding presentation property value is received as the value parameter. Presentation of the Web page is customized in response to the set page property API being invoked by altering a setting of the Web page corresponding to the received presentation property name to be the received presentation property value.

In accordance with one or more aspects of the advertisement-controlled Web page customization discussed herein, an advertisement available for retrieval from a computing device is maintained and returned to the computing device in response to an advertisement request from the computing device. The advertisement causes various actions to be performed on the computing device. These actions include identifying both a presentation property and a corresponding property value for a Web page in which the advertisement is being displayed, and setting the presentation property of the Web page to the corresponding property value.

In accordance with one or more aspects of the advertisement-controlled Web page customization discussed herein, a Web page available for retrieval from a computing device is maintained and returned to the computing device in response to a Web page request from the computing device. The Web page causes various actions to be performed on the computing device. These actions include receiving, from an advertisement being displayed as part of the Web page, both an identifier of a presentation property and an identifier of a corresponding property value. These actions further include customizing a presentation of the Web page by setting the presentation property of the Web page to the corresponding property value.

BRIEF DESCRIPTION OF THE DRAWINGS

The same numbers are used throughout the drawings to reference like features.

DETAILED DESCRIPTION

Advertisement-controlled Web page customization is discussed herein. When a Web page is loaded at a user's computer, an advertisement to be displayed as part of that Web page is also received. This advertisement is typically received from a separate advertising server. The received advertisement invokes one or more functions that are typically exposed by the Web page that allow the received advertisement to customize the presentation of the Web page. This customization can include setting various presentation properties to particular values, such as setting the background to a particular color, setting the background to a particular image, setting a border(s) to a particular size(s), indicating a particular sound(s) or audio clip(s) to be played, and so forth. This allows the advertisement to control the customization of the Web page when the advertisement is received, so different advertisements received at different times can each customize the presentation of the Web page in their own manners.

Figure 1:
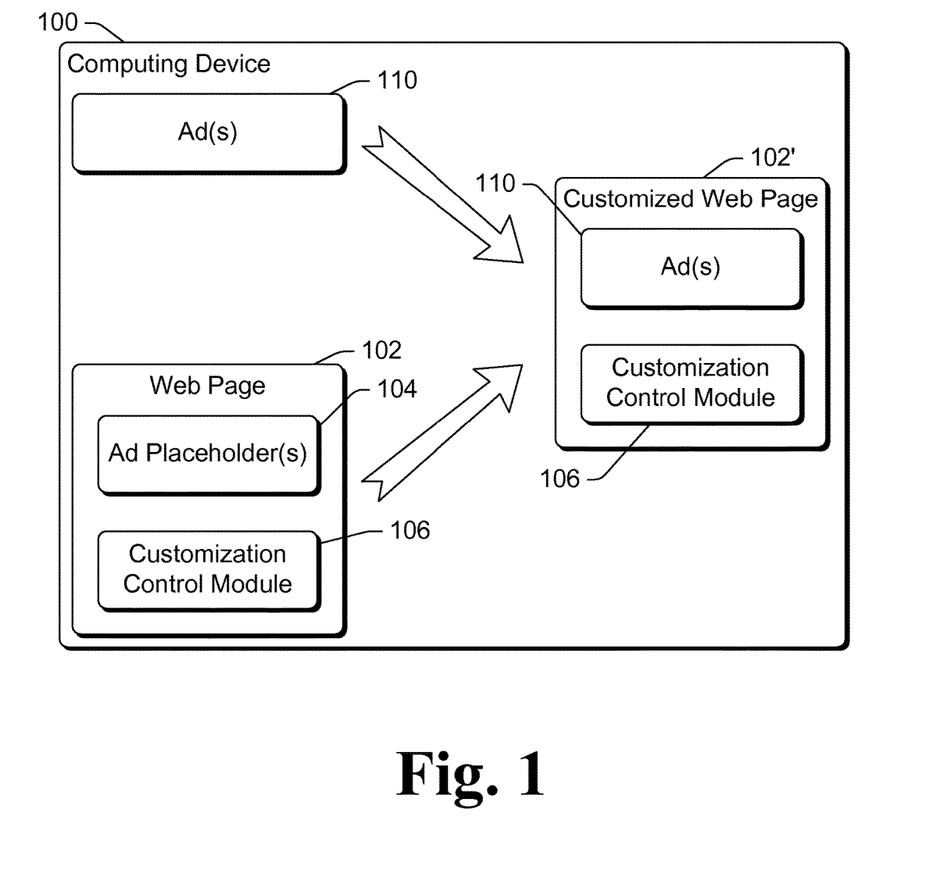
FIG. 1 illustrates an example customization of a Web page in accordance with one or more embodiments of the advertisement-controlled Web page customization.

FIG. 1 illustrates an example customization of a Web page in accordance with one or more embodiments. Initially, a computing device 100 obtains a Web page 102. Web page 102 can be obtained in any of a variety of manners. Web page 102 is typically loaded from a remote server via the Internet, although alternatively Web page 102 can be obtained from other sources. For example, Web page 102 can be obtained via the Internet from a cache, via a local network from another server, cache, or other computing device, from a local cache or local storage device of computing device 100, and so forth.

Web page 102 includes one or more advertisement (ad) placeholders 104 and a customization control module 106. Web page 102 is designed with one or more ad placeholders 104, allowing the designer of Web page 102 to indicate where advertisements are to be placed when Web page 102 is displayed by computing device 100. The content of these advertisements is not included in Web page 102 when it is designed. Rather, the content of these advertisements is obtained when Web page 102 is loaded and/or presented by computing device 100.

During operation, when Web page 102 is obtained by computing device 100, one or more ads 110 are also obtained by computing device 100. Typically, a Web browser executing on computing device 100 obtains Web page 102 for presentation at computing device 100. Alternatively, a different application other than a Web browser can obtain Web page 102. Once Web page 102 is obtained, instructions in ad placeholder(s) 104 direct the Web browser (or other application) to access an ad source in order to obtain ad(s) 110. The instructions in ad placeholder(s) 104 can invoke functionality exposed by the Web browser to obtain ad(s) 110, or alternatively the Web browser can analyze Web page 102 to identify ad placeholder(s) 104 and contact the ad source in response to identifying an ad placeholder(s).

Ad(s) 110 can be obtained in any of a variety of manners. Ad(s) 110 are typically loaded from a remote ad source via the Internet, although alternatively ad(s) 110 can be obtained from other sources. For example, ad(s) 110 can be obtained via the Internet from a cache, via a local network from another server, cache, or other computing device, from a local cache or local storage device of computing device 100, and so forth.

The ad(s) 110 are typically obtained by computing device 100 when Web page 102 is being loaded for display to the user of computing device 100. In some situations, Web page 102 can be obtained by computing device 100 and stored on a local storage device of computing device 100 without being displayed to the user. In one or more embodiments, ad(s) 110 are obtained by computing device 100 when Web page 102 is subsequently displayed to a user of computing device 100. Alternatively, in one or more other embodiments ad(s) 110 are obtained by computing device 100 when Web page 102 is loaded and stored on the local storage device of computing device 100.

Customization control module 106 is included as part of Web page 102. Customization control module 106 exposes functionality that can be invoked by the ad(s) 110. When an ad(s) 110 is obtained by computing device 100, the ad(s) 110 invokes this functionality exposed by module 106 in order to customize the presentation of Web page 102. Customization control module 106 can expose this functionality in any of a variety of different manners. In one or more embodiments, customization control module 106 is implemented in a scripting language, such as JavaScript™ available from Sun Microsystems, Inc. of Santa Clara, Calif., VBScript available from Microsoft Corporation of Redmond, Wash., and so forth. Alternatively, customization control module 106 can be implemented in different types of languages or in different manners that allow ad(s) 110 to invoke the functionality.

Customization control module 106 can alternatively be implemented in another application of computing device 100 rather than being included as part of Web page 102. For example, a Web browser or other application executing on computing device 100 can expose functionality that can be invoked by ad(s) 110, and in response to such functionality being invoked alter the presentation of Web page 102 as directed by ad(s) 110. By way of another example, a Web browser or other application executing on computing device 100 can analyze ad(s) 110 as they are received and determine whether the ad(s) 110 include any presentation properties. If ad(s) 110 do include presentation properties, the Web browser or other application can extract those presentation properties from ad(s) 110 and customize the presentation of Web page 102 in accordance with the extracted presentation properties.

Ad(s) 110 describe how to customize the presentation of Web page 102. Ad(s) 110 invoke the functionality exposed by customization control module 106 to customize Web page 102, resulting in customized Web page 102'. Customized Web page 102' includes ad(s) 110 and customization control module 106. Alternatively, customized Web page 102', having already been customized, can optionally drop or otherwise delete customization control module 106.

Additionally, the presentation of Web page 102' is customized in accordance with the presentation properties included in ad(s) 110. A wide variety of different presentation properties can be set, such as page color, background image, border sizes, sounds or audio clips to be played, and so forth. These presentation properties are discussed in more detail below.

It should be noted that these presentation properties are presentation properties applying to any of multiple different portions of the Web page. Although these presentation properties can customize the presentation of the ad itself, these presentation properties also alter or customize the presentation of one or more portions of the Web page other than the portion where the ad is being displayed as part of the Web page. The advertisement-controlled Web page customization discussed herein allows the entire Web page to be customized, not just the portion of the Web page that includes the ad.

Ad(s) 110 can be written in any of a variety of different manners and using any of a variety of different languages, formats, protocols, and so forth. In one or more embodiments, ad(s) 110 are written for any of a variety of different browser plug-ins or formats, such as Microsoft® Silverlight™ available from Microsoft Corporation of Redmond, Wash., Adobe® Flash® available from Adobe Systems Incorporated of San Jose, Calif., and so forth.

Figure 2:
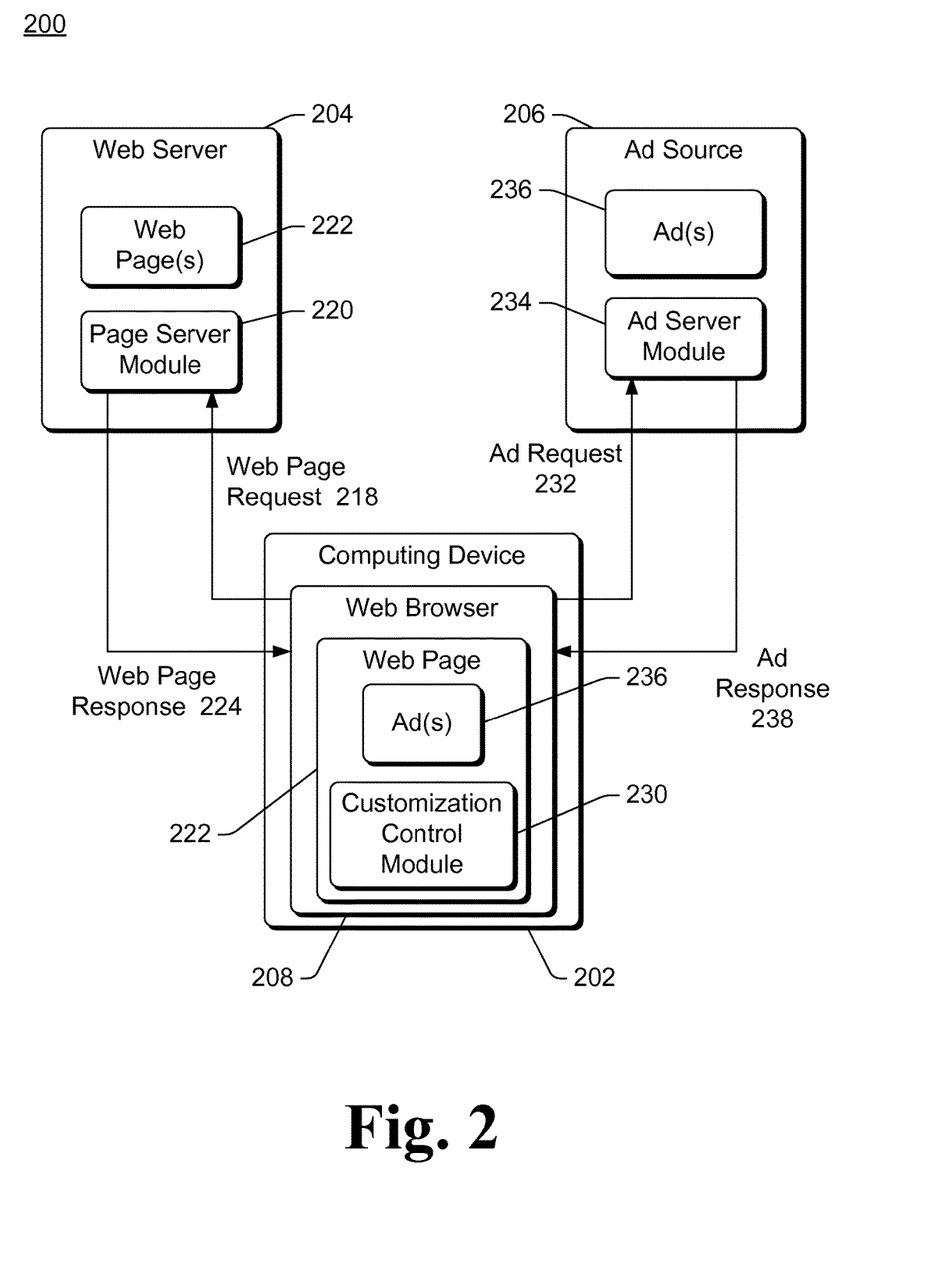
FIG. 2 illustrates an example system in which one or more embodiments of the advertisement-controlled Web page customization can be used.

FIG. 2 illustrates an example system 200 in which one or more embodiments of the advertisement-controlled Web page customization discussed herein can be used. System 200 includes a computing device 202, a Web server 204, and an ad source 206. Computing device 202 includes a Web browser 208. Computing device 202 can be any of a variety of different computing devices that can present Web pages (e.g., display Web pages, audibly play back Web pages, and so forth). Examples of computing device 202 include a desktop computer, a laptop computer, a handheld computer, a gaming console, a cellular phone, an automotive computer, and so forth. During operation, a user of computing device 202 interacts with Web browser 208 to request and view different Web pages. Web browser 108 can be any of a variety of different browser applications such as Internet Explorer® available from Microsoft Corporation of Redmond, Wash., Firefox® available from Mozilla Corporation of Mountain View, Calif., Opera available from Opera Software of Oslo, Norway, and so forth.

A user can request a particular Web page in different manners, such as by entering the URL (Uniform Resource Locator) of the Web page, by entering an IP (Internet Protocol) address, selecting a link in another Web page or other document being displayed, and so forth. Additionally, in one or more embodiments, Web browser 108 automatically requests a page on behalf of a user (e.g., a default page when Web browser 108 begins execution) and/or receives requests for Web pages from other applications executing on computing device 202.

When a Web page is requested, Web browser 208 issues a Web page request 218 for the Web page. In the illustrated example, the requested Web page is hosted by Web server 204, so request 218 is sent to Web server 204. Page server module 220 receives request 218 and returns the requested Web page 222 to Web browser 208 as part of Web page response 224.

Web page 222 as received from Web server 204 includes one or more ad placeholders and a customization control module 230. Customization control module 230 operates analogous to customization control module 106 of FIG. 1. Once Web page 222 is obtained by Web browser 208, the ad placeholders in Web page 222 cause Web browser 208 to send an advertisement request 232 to ad source 206. If multiple ad sources 206 exist, the ad placeholder(s) within Web page 222 identify the ad source(s) 206 to which the request 232 is to be sent. Alternatively, a particular one of multiple ad sources 206 can be identified in different manners, such as by Web browser 208, by another application running on computing device 202, by another application or component that receives ad request 232, and so forth.

Ad source 206 can be any of a variety of computing devices or services, and oftentimes is a remote server (e.g., accessed via the Internet). An ad server module 234 at ad source 206 receives request 232 and determines a particular one or more ads 236 that are to be returned to Web browser 208 in response to request 232. Ad server module 234 can determine which ad(s) are to be returned in any of a variety of manners, such as based on current advertising campaigns, rates paid by various advertisers, information regarding Web page 222, information regarding computing device 202, information regarding a user of computing device 202, and so forth. Ad server module 234 returns these one or more ad(s) as part of ad response 238.

Web browser 208 receives ad response 238 and displays the ad(s) 236 received with ad response 238 as part of Web page 222. As discussed above, ad(s) 236 can invoke functionality of customization control module 230 to customize the display of Web page 222. Ad(s) 236 invoke this functionality, altering the display of Web page 222 at client device 202 based on the customization parameters included in the ad(s) 236.

The advertisement-controlled Web page customization discussed herein can support multiple different presentation properties that allow Web pages to be customized in different ways. For example, backgrounds of different portions of Web pages can be customized by the ads to particular colors, backgrounds of different portions of Web pages can be customized by the ads to particular images, audio data (e.g., sounds or audio files) to be played back when the Web page is displayed or otherwise presented can be customized by the ads to particular audio data, particular logos displayed on the Web page can be customized by the ads to particular logos, borders in particular portions of the Web page can be customized by the ads to particular sizes, and so forth.

Table I illustrates an example of one or more presentation properties that can be used with the advertisement-controlled Web page customization discussed herein. It is to be appreciated that these properties discussed in Table I are only examples. Some or all of these properties can be used in different embodiments, and additional properties can be used in various embodiments. For example, different properties can be included that describe different portions of the Web page being displayed, describe one or more sounds and/or audio files to be played back with the Web page, and so forth. Additionally, reference is made in Table I to Cascading Style Sheets. Cascading Style Sheets are a well-known mechanism for adding style (e.g., colors, fonts, spacing, etc.) to Web pages. Additional information regarding Cascading Style Sheets is available from the World Wide Web Consortium (W3C), online at "www." followed by "w3.org".

TABLE I

| Property | Description |
| --- | --- |
| bg_color | background color of the entire Web page |
| bg_image | background image of the entire Web page |

TABLE I-continued

| Property | Description |
| --- | --- |
| bg_image_repeat | repeat settings for the background image (how the image is tiled on the background of the Web page) |
| bg_style | generic background style for the entire Web page (freefrom CSS (Cascading Style Sheets) settings) |
| header_height | height of the Web page header |
| body_color | color of the inner section of the Web page |
| body_image | image of the inner section of the Web page |
| body_image_repeat | repeat settings for the inner section of the Web page's image (how the image is tiled on the background of the Web page) |
| body_style | generic background style for the inner section of the Web page (freefrom CSS settings) |
| header_menu_style | CSS style of the Web page header's menu |
| header_search_style | CSS style of the Web page header's search box |
| vertical_logo_style | CSS style of the Web page top navigation logo |
| logo_image | image for a logo on the Web page (e.g., a logo of the company that controls the content of the Web page) |
| search_box_border | border style for the search box on the Web page |
| skin_ad_style | CSS style for the actual ad placeholder on the Web page |
| body_border | border style for the inner section of the Web page |
| nav_selection_style | CSS style of the top navigation selected item on the Web page |
| header_border | border style for the page header of the Web page |

In one or more embodiments, the customization control module (such as module 106 of FIG. 1 or module 230 of FIG. 2) exposes an application programming interface (API) that can be invoked by an ad. When invoking this API, the ad passes one or more presentation properties to the customization control module as parameters of the API. In one or more embodiments the API restricts which presentation properties can be customized by supporting a limited number of presentation properties (e.g., by supporting only the properties discussed above in Table I). In such embodiments, the ad identifies a particular one or more of the supported presentation properties as well as a corresponding value for each identified property. These property/value pairs are then used by the customization control module to customize the Web page. Alternatively, the ad may be able to provide any property/value pairs and have customization control module customize the Web page in accordance with the received property/value pairs. In such alternative embodiments, the API does not impose limits on what presentation properties of the Web page can be set.

In one or more embodiments, a set page property API is defined as follows:
    setPageProperty(name, value)
where "name" and "value" are the parameters of the API. The "name" parameter is an identifier of the presentation property name, identifying the presentation property that is to be customized. The "value" parameter is an identifier of the corresponding presentation property value, identifying the value that the presentation property is to be set to. Multiple name/value pairs can be included as parameters of the setPageProperty API, or alternatively only a single name/value pair can be included and multiple calls are made to the setPageProperty API to set multiple customization properties.

Alternatively, the customization control module can expose the functionality allowing an ad to customize the Web page in different manners. For example, different function(s) and/or procedure(s) could be exposed by the customization control module other than an API. By way of another example, a particular memory location or a particular file could be known by both the ad(s) and the customization control module. The ad(s) can write the desired presentation properties and corresponding values to this memory location or file, and the customization control module can access this memory location or file to retrieve the presentation properties and corresponding values for customizing this Web page. By way of another example, the customization control module can analyze the ad to identify the presentation properties and corresponding values, alleviating the ad(s) from invoking any API, function, procedure, and so forth of the customization control module.

The customization control module can customize the Web page in any of a variety of different manners. The customization control module can access the settings for the Web page in any of a variety of known manners, and alter those settings as desired based on the presentation properties received from the ad. In one or more embodiments, the Web browser maintains a document object model (DOM) describing the Web page. Customization control module 106 can directly access this document object model and alter the settings for various properties in this document object model. By changing the settings for these various properties, the presentation of the Web page is customized in the manner desired by the ad. The use of document object models and altering the presentation of a Web page by changing settings in the corresponding document object model is well known to those skilled in the art and thus will not be discussed further except as it pertains to the advertisement-controlled Web page customization discussed herein.

It should also be noted that situations can arise where multiple ads are displayed on the same Web page, and each of these ads can include presentation properties. This can result in potential conflicts between ads, as multiple ads may attempt to customize the same properties in different manners (e.g., the ads may attempt to set different background colors for the page). These situations can be resolved in different manners. In one or more embodiments, ads are assigned priority values that allow the priorities of the ads and/or presentation properties in the ads relative to one another to be identified. These values can be passed to the customization control module (e.g., when the API is invoked) or otherwise accessed by the customization control module. If multiple ads are displayed on the same Web page and include presentation properties, then the customization control module uses the presentation properties of the ad having the highest priority value and ignores the presentation properties of the other ad(s).

In alternate embodiments, priority values can be associated with particular presentation properties rather than with particular ads. In such embodiments, presentation properties from different ads can be used to customize the Web page. For example, assume two ads both have presentation properties for the background color for the entire page and for the height of the page header, and that the priority value for the background color property in the first ad is higher than the priority value for the background color property in the second ad, and that the priority value for the page header height in the first ad is lower than the priority value for the page header height in the second ad. In this example, the background color property in the first ad and the page header height in the second ad would be used to customize the presentation of the Web page.

In other embodiments, the customization control module restricts which presentation properties can be received from different ads. Some combinations of presentation properties can be permitted, in which case the properties in those permitted combinations can be received from different ads. Other combinations of presentation properties can be restricted, in which case the properties in those restricted combinations cannot be received from different ads. For example, the customization control module could allow settings for the background color for the page and the page header height to come from two different ads, but not allow the background color for the page and the background image for the page to come from two different ads. If a restricted combination is attempted by two or more ads, then the customization control module can determine which presentation properties to use based on priority values (for the ads and/or for the presentation properties) as discussed above.

It should further be noted that the advertisement-controlled Web page customization discussed herein can be enabled or disabled in different manners. In one or more embodiments, the Web page includes a flag or other indicator of whether ad placeholders (or ads) on the Web page are enabled. In such embodiments, ads are obtained from the ad source only if the ad placeholders and/or ads on the Web page are enabled. As the ads control customization of the Web page, the Web page is customized only if the ad placeholders and/or ads on the Web page are enabled so that the ads are obtained from the ad source.

Additionally, in one or more embodiments a flag or other indicator on the Web page indicates whether customization for the Web page is enabled or disabled. If the flag or other indicator indicates that customization for the Web page is enabled, then the customization control module performs the customization requested by the ad(s). However, if the flag or other indicator indicates that customization for the Web page is disabled, then the customization control module ignores any customization requested by the ad(s).

Furthermore, in one or more embodiments a user of a computing device can choose to enable or disable customization for the Web page. For example, the web browser can include a user configuration option allowing the user to select a user configuration setting regarding whether advertisement-controlled Web page customization is enabled or disabled. If the user configuration setting indicates that customization for the Web page is enabled, then the customization control module performs the customization requested by the ad(s). However, if the user configuration setting indicates that customization for the Web page is disabled, then the customization control module ignores and customization requested by the ad(s).

Additionally, it should be noted that the ad itself can include an indicator(s) of whether customization of the Web page is enabled, and the customization control module customizes the Web page in accordance with the presentation properties and corresponding values of the ad only if the ad indicates that customization for the Web page is enabled. For example, the ad may include an indication of particular dates and/or times of when the customization is enabled. By way of another example, the ad may include a counter of how frequently it is provided by the ad source in response to a request for an ad, and further include an indication of how frequently customization is performed (e.g., perform customization only every fifth time the ad is retrieved). By way of yet another example, the ad may include an indicator of a particular Web page(s) for which customization is enabled (or alternatively disabled). By way of another example, the ad may invoke the functionality to customize the Web page only under certain conditions (e.g., certain days, certain times of day, every third time the ad is retrieved, and so forth).

Figure 3:
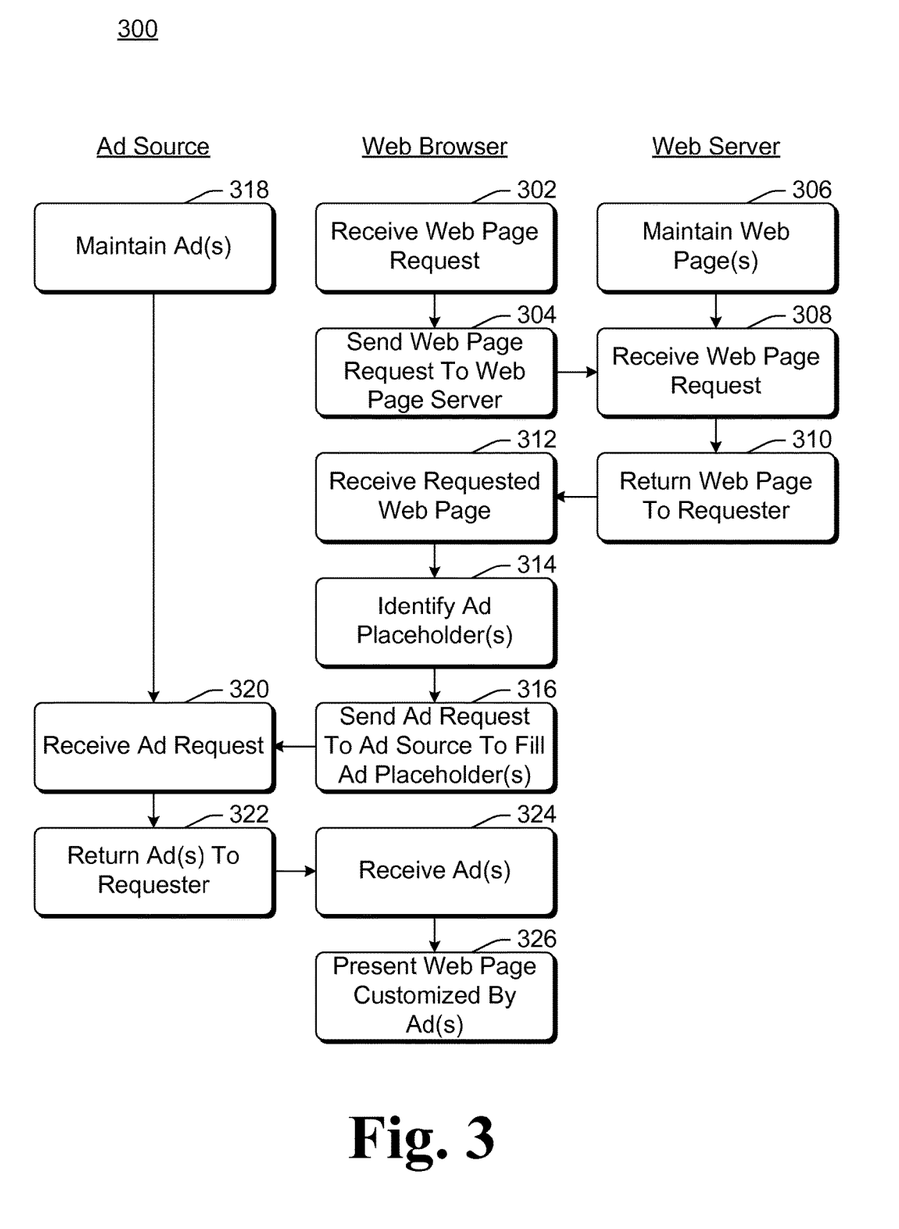
FIG. 3 is a flowchart illustrating an example process for customizing a Web page by an advertisement.

FIG. 3 is a flowchart illustrating an example process 300 for customizing a Web page by an advertisement. Process 300 is typically implemented in software, although alternatively one or more portions of process 300 can alternatively be implemented in firmware and/or hardware. Acts of process 300 illustrated on the left-hand side of FIG. 3 are carried out by an ad source, such as ad source 206 of FIG. 2. Acts of process 300 illustrated in the middle of FIG. 3 are carried out by a Web browser, such as Web browser 208 of FIG. 2. Acts of process 300 illustrated on the right-hand side of FIG. 3 are carried out by a Web page server, such as Web server 204 of FIG. 2.

At the Web browser, a Web page request is received (act 302). This request can be received from a user, can be a default request of the Web browser, can be received from another application, and so forth as discussed above. The Web browser sends a request to the Web server for the requested Web page (act 304). The Web server maintains or hosts one or more Web pages (act 306), making these Web pages available to requesters. The Web server receives the Web page request (act 308) and returns the requested Web page to the requester (act 310).

The Web browser receives the requested Web page from the Web server (act 312) and identifies one or more ad placeholders in the Web page (act 314). The Web browser sends, on behalf of the Web page and/or the ad placeholder(s), an ad request to the ad source to fill the ad placeholder(s) (act 316). The ad source maintains or hosts one or more ads (act 318), making these ads available to requesters. The ad source receives the ad request (act 320) and returns one or more ads to the requester (act 322). A fixed number of ads can be returned in act 322 (e.g., one ad per request), or alternatively the ad request received in act 320 may indicate how many ads are being requested, in which case the requested number of ads are returned in act 322.

The Web browser receives the ad(s) from the ad source (act 324). The ad(s) customize the Web page as discussed above, and the Web browser presents the Web page as customized by the ad(s) (act 326). It should be noted that an amount of time typically elapses between receipt of the Web page in act 312 and receipt of the ad(s) in act 324. In one or more embodiments, when the Web page includes ad placeholder(s), the Web browser waits to present the Web page in act 326 until the ad(s) are received in act 324 and the Web page is customized by the ad(s). Alternatively, the Web browser can begin presentation of the Web page as soon as the Web page is received in act 312, and then change the presentation of the Web page to the customized Web page after the Web page has been customized by the ad(s).

As discussed above, any of various presentation properties of the Web page can be customized by the ad(s) for the customized Web page presented in act 326. These presentation properties can alter the presentation of one or more portions of the Web page other than the portion where the ad is being displayed as part of the Web page.

Figure 4:
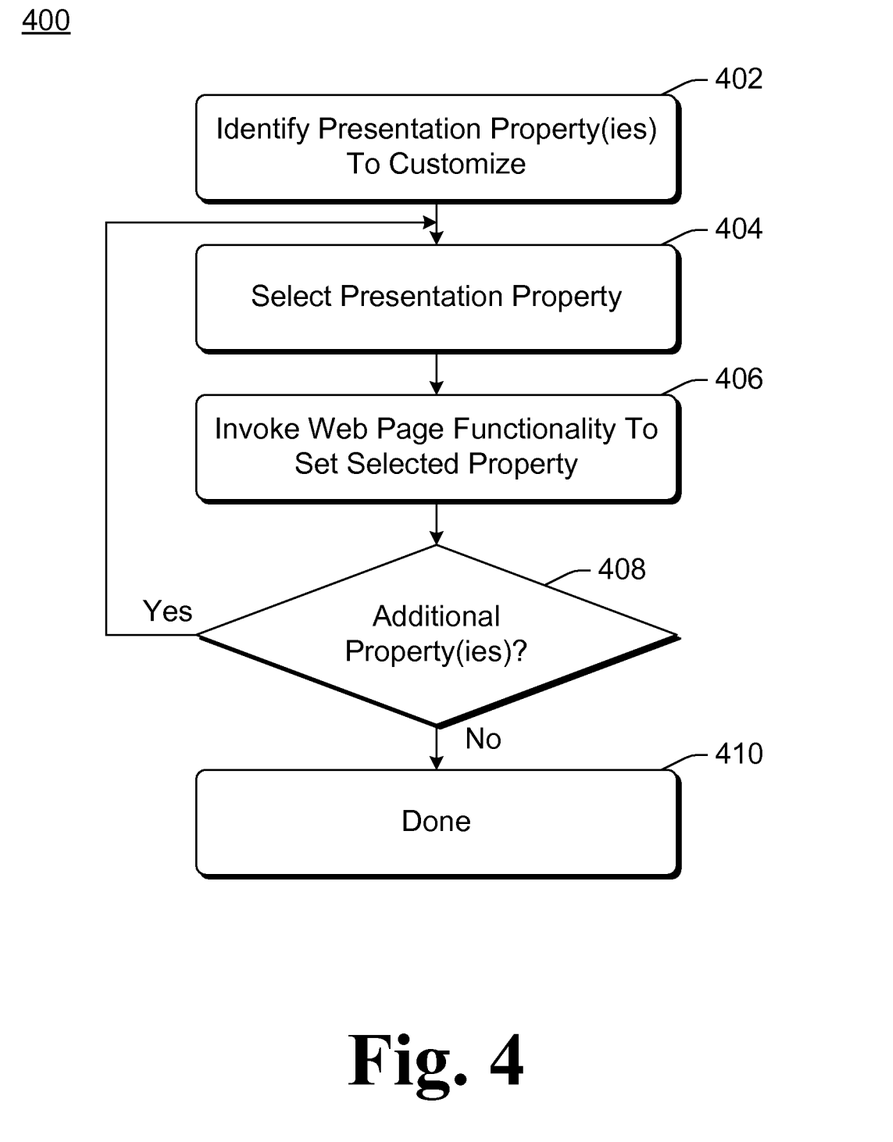
FIG. 4 is a flowchart illustrating an example process for an advertisement setting presentation properties of a Web page.

FIG. 4 is a flowchart illustrating an example process 400 for an advertisement setting presentation properties of a Web page. Process 400 is typically implemented in software, although alternatively one or more portions of process 400 can alternatively be implemented in firmware and/or hardware. Process 400 is carried out by an advertisement, such as advertisement(s) 110 of FIG. 1 or advertisement(s) 236 of FIG. 2.

Initially, one or more presentation properties to customize are identified (act 402). These presentation properties can be identified in different manners. In one or more embodiments, the presentation properties are included as parameters of a set page property API. Alternatively, the presentation properties can be included as a list or other record in the advertisement.

One of the presentation properties is selected (act 404), and functionality of the Web page is invoked to set the selected property (act 406). This setting includes invoking the functionality of the Web page to identify the presentation property as well as the corresponding value for that presentation property. A check is then made as to whether there are any additional presentation properties to be set (act 408). If there are additional presentation properties to be set, then process 400 returns to act 400 to select one of those presentation properties. If there are no additional presentation properties to be set, then process 400 is done for this advertisement (act 410).

In one or more embodiments, process 400 is implemented using a set page property API as discussed above. The set page property API can be invoked for each presentation property to be set, or alternatively the set page property API can be invoked once to set multiple presentation properties for the Web page.

Figure 5:
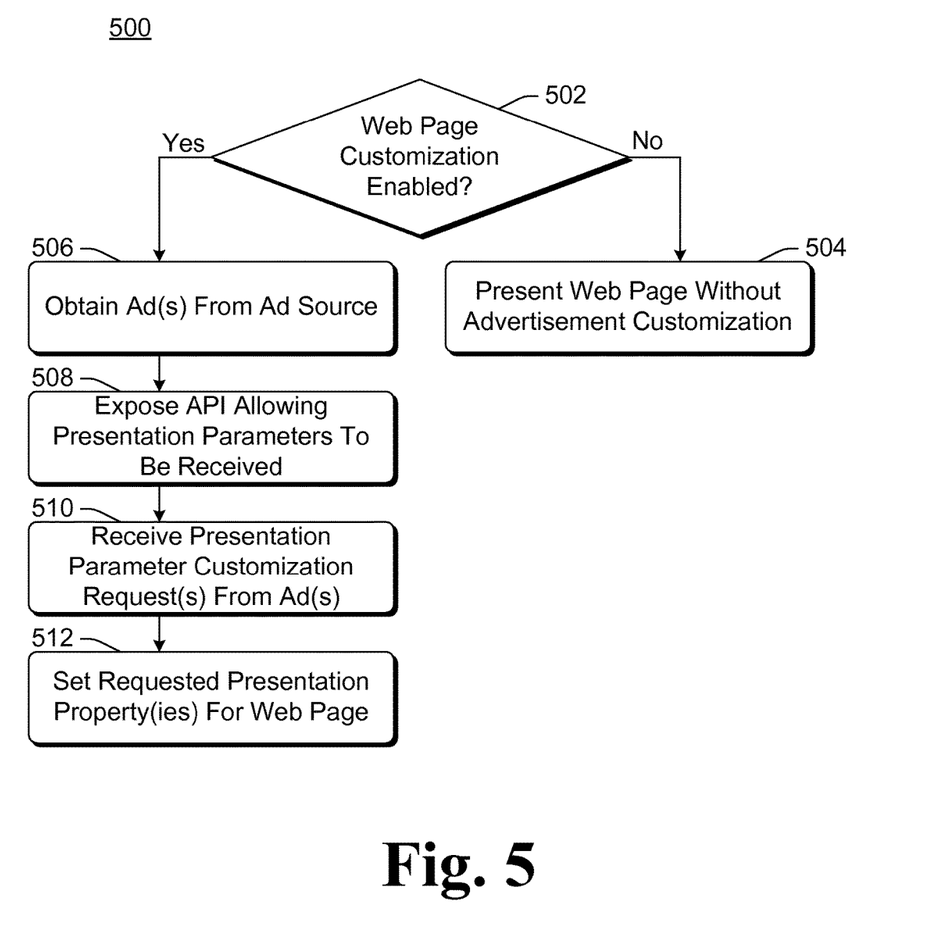
FIG. 5 is a flowchart illustrating an example process for customizing a Web page.

FIG. 5 is a flowchart illustrating an example process 500 for customizing a Web page. Process 500 is typically implemented in software, although alternatively one or more portions of process 500 can alternatively be implemented in firmware and/or hardware. Process 500 is carried out by a Web page, such as Web page 102 of FIG. 1 or Web page 222 of FIG. 2. Process 500 is typically carried out when the Web page is being loaded for presentation by a Web browser, although process 500 may alternatively be carried out at other times (e.g., as a Web page is being stored in a local cache).

Initially, a check is made as to whether Web page customization for the Web page is enabled (act 502). As discussed above, in one or more embodiments the advertisement-controlled Web page customization can be enabled or disabled in a variety of different manners. If Web page customization for the Web page is not enabled, then the Web page is presented without any customization by an ad (act 504).

However, if Web page customization is enabled for the Web page, then an ad(s) for each ad placeholder on the Web page is obtained from an ad source (act 506). The Web page exposes an API allowing presentation parameters to be received (act 508), and receives one or more presentation parameter customization requests by the ad(s) invoking the exposed API (act 510). This API is, for example, the set page property API discussed above. The presentation properties identified in the presentation parameter customization request(s) are then set to the corresponding property values identified in the presentation parameter customization request(s) (act 512).

Process 500 is discussed with reference to the Web page exposing an API allowing the presentation parameters to be received. Alternatively, the Web page can expose functionality allowing the presentation parameters to be set in any of a variety of other manners other than exposing an API as discussed above.

Figure 6:
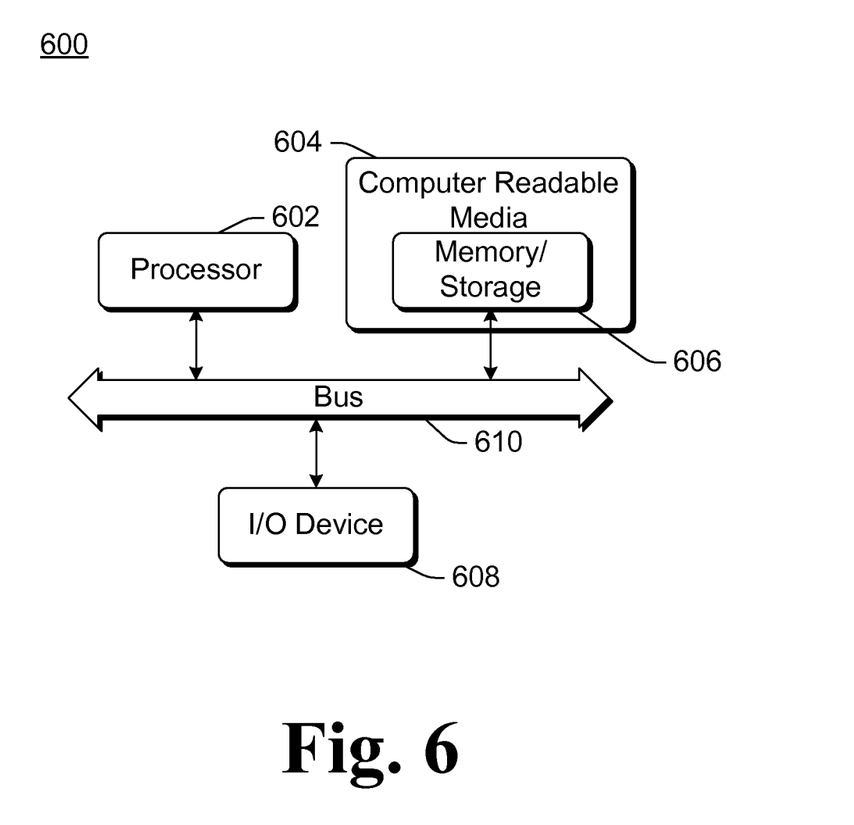
FIG. 6 illustrates an example computing device that can be configured to implement the advertisement-controlled Web page customization in accordance with one or more embodiments.

FIG. 6 illustrates an example computing device 600 that can be configured to implement the advertisement-controlled Web page customization in accordance with one or more embodiments. Computing device 600 can implement any of the techniques and processes discussed herein.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or I/O device(s) 608 can be included as part of, or alternatively may be coupled to, computing device 600. Bus 610 represents one or more of any of several types of bus structures, including a memory bus or memory controller, a peripheral bus, an accelerated graphics port, and a processor or local bus using any of a variety of bus architectures. Bus 610 can include wired and/or wireless buses.

Memory/storage component 606 represents one or more computer storage media. Component 606 can include volatile media (such as random access memory (RAM)) and/or nonvolatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processor 602. It is to be appreciated that different instructions can be stored in different components of computing device 600, such as in processor 602, in various cache memories of processor 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Additionally, it should be noted that in one or more embodiments the advertisement-controlled Web page customization techniques discussed herein can be implemented in hardware. For example, one or more logic circuits, application-specific integrated circuits (ASICs), programmable logic devices (PLDs), and so forth can be created and/or configured to implement the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a Web server computing device to customize display of a Web page at a client computing device that requests the Web page, based on ad content received from a second server computing device that is to be displayed as part of the Web page, the method comprising:
   generating the Web page at the Web server computing device, the Web page being available for retrieval from the Web server computing device by the client computing device, wherein the Web page includes a first portion and a second portion within a displayable area, wherein the second portion is an area designated for display of received advertisement content, and wherein the Web page is generated to include an application programming interface (API) used to customize display characteristics of the Web page;
   communicating, by the Web server computing device, the Web page to the client computing device in response to a Web page request from the client computing device, the Web page being executable by a browser application of the client computing device to cause the client computing device to perform actions including:
      receiving, from an ad source of the second server computing device, the ad content that is to be displayed in the second portion of the Web page, the ad content specifying a customization to a display characteristic of the first portion of the Web page through inclusion of both an identifier of a presentation property and an identifier of a corresponding property value; and
      configuring the Web page to include the ad content in the second portion and the customization to the display characteristic in the first portion, in part, by using a function of the API for setting the presentation property of the first portion of the Web page to the corresponding property value.

2. A method as recited in claim 1, wherein the actions further include:
   determining whether to configure the Web page to include the customization based at least in part on a priority value associated with the presentation property and the corresponding property value relative to a second priority value associated with another presentation property and corresponding property value received as part of other ad content.

3. A method as recited in claim 1, wherein the actions further include:
   receiving second ad content that is to be displayed as part of the Web page, the second ad content specifying a second customization to the Web page through inclusion of both an identifier of a second presentation property and an identifier of a second corresponding property value; and
   configuring the Web page to include the second ad content and the second customization by setting the second presentation property of the Web page to the second corresponding property value.

4. A method as recited in claim 1, wherein the actions further include:
   checking an indicator in the Web page that indicates whether customization of the Web page is enabled; and
   configuring the Web page to include the customization only if customization of the Web page is enabled.

5. A method as recited in claim 1, wherein the presentation property and the corresponding property value identify a color for one or more portions of the Web page other than where the advertisement is being displayed.

6. A method as recited in claim 1, wherein the actions further include exposing a set page property function of the API, receiving the identifier of the presentation property as a first parameter of the set page property API, and receiving the identifier of the corresponding property value as a second parameter of the set page property API.

7. One or more computer hardware storage devices having instructions stored thereon that are executable by one or more server computing devices to cause the one or more server computing devices to implement a page server configured to enable a Web page to be customized according to ad content that is to be displayed as part of the Web page, the page server configured to enable the Web page to be customized by performing operations comprising:
   generating the Web page at the one or more server computing devices, the Web page being available for retrieval from the one or more server computing devices by a client computing device, wherein the Web page includes a first portion and a second portion within a displayable area, wherein the second portion is an area designated for display of received advertisement content, and wherein the Web page is generated to include an application programming interface (API) used to customize display characteristics of the Web page; and
   communicating the Web page to the client computing device in response to a Web page request from the client computing device, the Web page being executable by a browser application of the client computing device to cause the client computing device to perform actions including:
      receiving, from an ad source of a second server computing device, the ad content that is to be displayed in the second portion of the Web page, the ad content specifying a customization to a display characteristic of the first portion of the Web page through inclusion of both an identifier of a presentation property and an identifier of a corresponding property value; and
      configuring the Web page to include the ad content in the second portion and the customization to the display characteristic in the first portion, in part, by using a function of the API to set the presentation property of the first portion of the Web page to the corresponding property value.

8. One or more computer hardware storage devices as recited in claim 7, wherein the actions further include:
   determining whether to configure the Web page to include the customization based at least in part on a priority value associated with the presentation property and the corresponding property value relative to a second priority value associated with another presentation property and corresponding property value included as part of other ad content received from another ad source.

9. One or more computer hardware storage devices as recited in claim 7, wherein the actions further include:
   receiving, from a second ad source of a third server computing device, second ad content that is to be displayed as part of the Web page, the second ad content specifying a second customization to the Web page through inclusion of both an identifier of a second presentation property and an identifier of a second corresponding property value; and
   configuring the Web page to include the second ad content and the second customization, in part, by setting the second presentation property of the Web page to the second corresponding property value.

10. One or more computer hardware storage devices as recited in claim 7, wherein the actions further include:
    checking an indicator in the Web page that indicates whether customization of the Web page is enabled; and
    configuring the Web page to include the customization only if customization of the Web page is enabled.

11. One or more computer hardware storage devices as recited in claim 7, wherein the presentation property and the corresponding property value identify a color for one or more portions of the Web page other than where the advertisement is being displayed.

12. One or more computer hardware storage devices as recited in claim 7, wherein the actions further include:
    exposing a set page property function of the API;
    receiving the identifier of the presentation property as a first parameter of the set page property API; and
    receiving the identifier of the corresponding property value as a second parameter of the set page property API.

13. A method performed by a client computing device to customize a Web page received from a Web server computing device at the client computing device that requests the Web page, based on ad content received from another server that is to be displayed as part of the Web page, the method comprising:
    requesting the Web page from the Web server computing device, the Web page being available for retrieval from the Web server by the client computing device, wherein the Web page includes a first portion and a second portion within a displayable area, wherein the second portion is an area designated for display of received advertisement content, and wherein the Web page is generated to include an application programming interface (API) used to customize display characteristics of the Web page; and
    communicating, to the client computing device by the Web server, the Web page to the client computing device in response to a Web page request from the client computing device, the Web page being executable by a browser application of the client computing device to cause the client computing device to perform actions including:
       receiving, from a first ad source of a second server computing device, first ad content that is configured for display in the second portion of the Web page, the first ad content specifying a first customization to a display characteristic of the first portion of the Web page through inclusion of both a first identifier of a presentation property and an identifier of a first corresponding property value;

receiving, from a second ad source of a third server computing device, second ad content that is configured for display in the second portion of the Web page, the second ad content specifying a second customization to a display characteristic of the first portion of the Web page, the second customization specified in the second ad content through inclusion of both a second identifier of the presentation property and an identifier of a second corresponding property value;

determining, based on priority values assigned to the first and second ad content, whether to configure the first portion of the Web page to include the first or second customization; and configuring the Web page to apply the determined customization to the display characteristic in the first portion, in part, by using a function of the API to set the presentation property of the first portion of the Web page to the determined one of the first corresponding property value or the second corresponding property value.

* * * * *